United States Patent Office 3,231,402
Patented Jan. 25, 1966

3,231,402
PRODUCTION OF REFRACTORY GRAIN
Earl Leatham, Wexford, Pa., assignor to Harbison-Walker Refractories Company, Pittsburgh, Pa., a corporation of Pennsylvania
No Drawing. Filed May 25, 1962, Ser. No. 197,611
7 Claims. (Cl. 106—58)

This invention relates to the manufacture of high purity, dead burned, inorganic refractory oxide grain.

More particularly, this invention relates to improvements in the production of refractory oxide grain, as disclosed in co-pending United States applications S.N. 847,864—filed October 22, 1959, for "Production of Dead Burned Grain," now United States Patent No. 3,060,000, and S.N. 40,181—filed July 1, 1960, for "Production of Dead Burned Grain," now United States Patent No. 3,060,042, both having the same assignee as the present invention. In these copending applications, there are taught methods of treating certain refractory oxides to obtain high purity, dense, hydration-resistant refractory grain without the use of adulterating inorganic or organic additives, fluxes or temporary coating materials or compositions; and without the necessity of using such as complex sintering and/or fusing processes.

As pointed out in the above mentioned co-pending applications, particularly when dealing with the use of dolomitic minerals, calcium oxide or magnesia to manufacture brick, the inherent affinity of these materials for moisture, with the concomitant disintegration due to hydration, has severely limited their use. Of course, diverse and repeated attempts have been made to inhibit hydration reactions to thereby take advantage of the excellent refractoriness of these minerals. For instance, in the United States patent to Whittemore, 2,876,122, a process is taught including coating a mass of lime particles with such as kerosene with subsequent sintering. In the United States patent to Hughey, 2,640,759, a method of preventing hydration and obtaining a high apparent density with dolomite, lime, and magnesia mixtures is taught, in which various irony fluxes such as mill scale are used. Of course, while the Hughey material is satisfactory for some purposes, the irony fluxes he includes are undesirable in many modern steel-making processes in which complicated and chemically active slags are present. Others, such as the United States patent to Hathaway—2,678,887, have taught the use of such exotic refractory oxides as zirconia or titania with lime, to obtain better refractory material. Of course, the expense incident to the addition of such exotic refractory oxides severely delimits the environments in which such materials may be used economically. The United States patents to Woodward—2,695,242 and Pike—2,348,847 and 2,478,593 are pertinent and teach processes for causing an autogenous action with incident hardening to obtain denser refractory aggregate materials.

The art is replete, and particularly the patent literature, with suggestions for the stabilization of lime or dolomitic materials. However, most suggestions have incurred use of some manner of adulterating additive. For example, Richter, No. 149,338, shows stabilizing lime with mica; Livingston, No. 241,034, shows stabilizing lime with silica; Newberry, No. 677,688, teaches stabilizing dolomite with clay; Jones, No. 1,251,535, discloses stabilizing dolomite with blast furnace flue dust; Kennedy, No. 1,238,020, shows stabilizing dolomite with silica and iron oxide and/or alumina; Newberry, No. 1,267,686, discloses stabilizing dolomite with alumina and iron oxide; Baker, Nos. 1,063,102 and 1,063,103, while not disclosing additives, do disclose stabilizing dolomite through particular burning; Newberry, No. 1,400,087, shows stabilizing lime with clay; Ernould, No. 2,076,883, shows stabilizing lime with iron oxide or chromium oxide; Syz, No. 2,380,480, teaches stabilizing dolomite with fluorides; Fisk, No. 2,528,471, suggests stabilizing lime with titanium dioxide; McAllister, No. 2,916,389, uses magnesia and iron oxide to stabilize lime; and the United States patent to Cutler, 3,026,211, teaches a sintering process and carefully controlled raw material characteristics to stabilize lime.

Co-pending application, S.N. 847,864, dealt particularly with producing dead burned magnesia having a bulk density of at least about 3.25. Such a density represents well over 90% of the theoretical bulk density of pure magnesia, which is about 3.58. Co-pending application, S.N. 40,181, discloses a method of producing dead burned dolomite, dead burned lime (calcium oxide), and dead burned mixtures thereof, with free magnesia in which the resulting products were of very high density, high purity, and highly resistant to hydration. The density of the materials obtained by the process of co-pending application, 40,181, is about 3.25 grams/cc., for example.

As noted above, the theoretical density of pure magnesia is 3.58 grams/cc. The theoretical density of pure calcium oxide is 3.40 grams/cc. Thus, the theoretical density of a mixture of lime and magnesia should be between 3.40 and 3.58 grams/cc. Thus, the 3.25 grams/cc., apparent bulk density obtained according to the process disclosed in co-pending application 40,181, is good. However, it is a primary object of this invention to teach a method by which an apparent bulk density of over 3.30 grams/cc., and as high as 3.40 grams/cc. may be obtained in a high purity calcium oxide and magnesium oxide product.

It is a further object of this invention to teach an improved method of obtaining very high purity and very high density refractory aggregate grain, which grain consists of over 98% magnesium oxide and calcium oxide values (less than 2% total impurities).

And it is yet another object of this invention to produce highly stable, high purity and dense refractory grain consisting of up to about 98% calcium oxide.

Briefly, in one embodiment according to this invention, it has been discovered that if calcium oxide or dolomite minerals are first reduced to extremely fine size, i.e., less than about 20 microns, prior to intimate admixing with magnesia, that upwards of 20% longer campaign life is obtained with refractory brick made therefrom. In a preferred embodiment, the material admixture is obtained in an aqueous bath.

The raw materials utilized in fabricating a refractory grain, according to this invention, have the following purity and sizing characteristics:

(1) Magnesia—at least 97% purity, substantially all less than about 6 microns in size.
(2) Calcium oxide—at least about 99% purity, substantially all less than 20 microns.
(3) Calcined dolomite—99% calcium oxide and magnesium oxide, on the basis of an oxide analysis—substantially all less than 20 microns in size.

The calcined dolomite used according to this invention has an ignition loss on the order of up to about 0.5%, by weight. The calcium oxide has an ignition loss on the average of up to about 0.7%, by weight. The magnesia has an ignition loss on the order of up to about 1%, by weight.

In one test, about 10%, by weight, of CaO and about 90%, by weight, MgO (on the basis of an oxide analysis) were treated according to this invention. It was discovered that the fine particles of lime or calcined dolomite and the magnesia which is mixed therewith must be intimately admixed to a substantially uniform batch, in order to obtain best results. It was discovered the best manner of obtaining this uniform admixture of very fine particles was by adding the calcium oxide as a Ca(OH)$_2$ (which had been made by dry slaking CaO) to a mixture of Mg(OH)$_2$ in water. The resulting suspension was filtered to remove as much water as possible, and was then calcined in a multiple hearth furnace to remove all free water and substantially all chemically combined water, and obtain a mixture of dry finely divided calcia and magnesia particles. The resulting material (still free of all free water and substantially all chemically combined water, the discrete magnesia particles averaging less than about 6 microns, and the calcium oxide particles less than about 20 microns) was fed to briquetting rolls, which produced generally almond-shaped briquettes measuring about 1.5 x ¾ x ⅝". The calcined material was fed to the briquetting rolls under ambient temperature conditions. A pressure of 30,000 p.s.i. was exerted by the rolls, but pressures as low as 20,000 p.s.i. may be used to obtain satisfactory briquettes. No bonding agents, fluxing materials, temporary coating or binding materials were utilized, nor was it necessary to indulge in sintering or fusing steps, and yet the briquette-like bodies emanating from the briquetting step were strong, well filled out and resisted dusting when confined to a vertical kiln and dead burned at temperatures ranging from 3,500 to 4,000° F. After about one half hour in the firing zone of the kiln, the briquette-like bodies were discharged and their apparent bulk density determined. The bulk density of these briquettes was found to be 3.35 grams/cc. In still other tests, briquettes having an apparent bulk density of 3.40 grams/cc. were obtained.

The temperature of the calcining step for the materials used in the above discussed examples, was between 1,600 and 2,200° F. However, any method of burning which will produce a product having an ignition loss of not over 1% is equally applicable.

Refractory brick made from grain manufactured according to the procedure above discussed were used in an oxygen converter; and these brick had a campaign life 20% longer than previously available brick, such as brick fabricated from the refractory grain disclosed in copending application No. 40,181.

Improved calcia-magnesia refractories may be made according to the concepts of this invention containing from 98 to 1% magnesia, by weight, and from 2 to 99% calcia, by weight. It is essential, however, that the calcia be added as extremely fine particles, and caused to be intimately admixed with the magnesia before briquetting. Calcia particles of less than about 20 microns are very satisfactory for the purposes of this invention. They may be added as CaO, Ca(OH)$_2$, CaCO$_3$, CaO·MgO, Ca(OH)$_2$·Mg(OH)$_2$ or CaCO$_3$·MgCO$_3$ to a suspension of high purity magnesium hydroxide particles in water.

In summary, a mixture of magnesium hydroxide, water and CaO particle producing material is thoroughly mixed, filtered, and calcined to remove all free water and substantially all chemically combined water to provide an intimate admixture of very fine particles of CaO and MgO. The foregoing is briquetted at at least 20,000 p.s.i., and dead burned in a temperature range of from 3,500 to 4,000° F. The density of the resulting product, which is obtainable according to this process, is substantially always above 3.35 grams/cc., and as high as 3.40 grams/cc. Constituents other than MgO and CaO, on an ignition-free basis, amount to less than about 1%, by weight. These impurities consist of fractional weight percents of iron oxide, aluminum oxide and silicon dioxide.

Having thus described the invention in detail and with sufficient particularity as to enable those skilled in the art to practice it, it should be understood that the foregoing merely represents preferred practice of the invention, and that the true measure of the spirit and scope thereof is to be as defined in the hereafter appended claims.

I claim:

1. In the method of producing high purity, dense, dead burned refractory grain, including the steps of dry forming into small compressed bodies at a pressure of at least 20,000 p.s.i., a composition substantially free of free and chemically combined water, and consisting essentially entirely of calcium oxide and magnesium oxide on an oxide basis, having less than about 2%, by weight, impurities and chemically combined water, and subjecting said bodies to dead burning at a temperature above 3,200° F., the improvement which comprises intimately admixing calcium oxide and magnesium oxide containing materials, substantially all of the discrete particles of which are less than about 20 microns in size, in an aqueous bath, filtering the intimately admixed particles from said batch, calcining the filtered and intimately admixed particles, then forming compressed bodies from the calcined material, said calcined material being free from binder additions and flux materials, and subsequently dead burning said compressed bodies to obtain a dead burned product having an apparent bulk density over substantially about 3.30 grams/cc.

2. The method of claim 1, in which the calcium oxide is added in the form of calcium hydroxide.

3. The method of claim 1, in which the calcium oxide is added in the form of calcium carbonate.

4. The method of claim 1, in which the calcium oxide is added in the form of CaO·MgO.

5. The method of claim 1, in which the calcium oxide is added in the form of Ca(OH)$_2$·Mg(OH)$_2$.

6. The method of claim 1, in which the calcium oxide is added in the form of CaCO$_3$·MgCO$_3$.

7. The method of claim 1, in which the dead burning is at a temperature of from 3,400 to 3,500° F.

References Cited by the Examiner
UNITED STATES PATENTS

| | | | |
|---|---|---|---|
| 2,876,122 | 3/1959 | Whittemore | 106—63 |
| 3,026,211 | 3/1962 | Cutler | 106—58 |
| 3,060,042 | 10/1962 | Leatham | 106—63 |
| 3,074,806 | 1/1963 | Atlas et al. | 106—58 |

TOBIAS E. LEVOW, *Primary Examiner.*

J. E. POER, *Assistant Examiner.*